United States Patent
Bessho et al.

(10) Patent No.: US 6,614,000 B1
(45) Date of Patent: Sep. 2, 2003

(54) ORGANIC HALOGEN COMPOUND DECOMPOSING DEVICE AND OPERATION CONTROL METHOD THEREFOR, AND ORGANIC HALOGEN COMPOUND DECOMPOSING METHOD

(75) Inventors: Masahiro Bessho, Nagoya (JP); Toshio Hattori, Nagoya (JP); Yasuhiro Tsubaki, Nagoya (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 09/719,443

(22) PCT Filed: Apr. 12, 2000

(86) PCT No.: PCT/JP00/02366

§ 371 (c)(1),
(2), (4) Date: Dec. 12, 2000

(87) PCT Pub. No.: WO00/61284

PCT Pub. Date: Oct. 19, 2000

(30) Foreign Application Priority Data

| Apr. 12, 1999 | (JP) | 11-104610 |
| May 20, 1999 | (JP) | 11-140714 |
| Jul. 15, 1999 | (JP) | 11-202326 |

(51) Int. Cl.[7] ............................................. B23K 10/00
(52) U.S. Cl. .......................... 219/121.48; 219/121.52; 219/121.5; 315/111.51
(58) Field of Search ................. 219/121.5, 121.48, 219/121.52, 121.43, 121.38; 204/298.21; 315/111.31, 111.21, 111.41, 11.51

(56) References Cited

U.S. PATENT DOCUMENTS

| 5,028,452 A | 7/1991 | Beatty |
| 5,063,329 A | * 11/1991 | Oamoto .................. 315/111.21 |
| 5,086,255 A | * 2/1992 | Okamoto et al. ....... 315/111.21 |
| 5,225,740 A | * 7/1993 | Ohkawa ................. 315/111.41 |
| 5,569,810 A | 10/1996 | Tsuji |
| 6,340,863 B1 | * 1/2002 | Ieda et al. .............. 315/111.21 |

FOREIGN PATENT DOCUMENTS

| CN | 90107816.6 | 12/1991 |
| JP | 37-10879 | 4/1935 |
| JP | 03222298 A | 1/1991 |
| JP | 3-222298 | 10/1991 |
| JP | 4-502882 | 5/1992 |
| JP | 7-80287 | 3/1995 |
| JP | 07080287 A | 3/1995 |
| JP | 8-24560 | 1/1996 |
| JP | 08022560 A | 1/1996 |
| JP | 8-323133 | 12/1996 |
| JP | 08323133 A | 12/1996 |
| WO | WO 91/04104 | 4/1991 |

* cited by examiner

Primary Examiner—Mark Paschall
(74) Attorney, Agent, or Firm—Scully, Scott, Murphy & Presser

(57) ABSTRACT

The present invention is an organic halogen compound decomposition device which utilizes a plasma, wherein a stable and reliable ignition at operation commencement is possible, and where following ignition, a good plasma form can be maintained and stable operation is possible. The organic halogen compound decomposition device is equipped with a cylindrical waveguide 7 made up of an outer conductor 8 and an inner conductor 9, and a dual construction discharge tube 5 made up of an inner tube 11 and an outer tube 12 which is provided inside the cylindrical waveguide 7 and on an identical axis. Furthermore, a probe antenna 9*a* formed from an extension of the inner conductor 9 is positioned so as to encircle the discharge tube 5, and the tip of the inner tube 11 is positioned further inwards than the tip of the probe antenna 9*a*.

5 Claims, 6 Drawing Sheets

FIG. 7

| AXIAL FLOW RATE V (cm/sec) | CASE 1 (d=6/D=10) | CASE 2 (d=6/D=13) | CASE 3 (d=8/D=13) |
|---|---|---|---|
| 21.25 | × | × | × |
| 42.5 | × | × | × |
| 85 | ○ | ○ | ○ |
| 212.5 | ○ | ○ | ○ |
|  | ◎ | ◎ | ◎ |
| 425 | ◎ | ◎ | ◎ |
| 637.5 | ◎ | ◎ | ◎ |
| 850 | ◎ | ◎ | ◎ |

NOTE 1)  d : EXTERNAL DIAMETER OF INNER TUBE (mm)
D : INTERNAL DIAMETER OF OUTNER TUBE (mm)

NOTE 2)  × : UNSTABLE IGNITION
○ : IGNITION RATIO OF AT LEAST 90%
◎ : IGNITION RATIO OF 100%

ORGANIC HALOGEN COMPOUND DECOMPOSING DEVICE AND OPERATION CONTROL METHOD THEREFOR, AND ORGANIC HALOGEN COMPOUND DECOMPOSING METHOD

BACKGROUND ART

1. TECHNICAL FIELD

The present invention relates to an organic halogen compound decomposition device which utilizes a plasma, a decomposition method for organic halogen compounds using the device, and an operation control method for the above decomposition device. In particular the invention relates to an organic halogen compound decomposition device which uses microwaves to generate a plasma, a microwave plasma torch and a plasma ignition method suitable for use in the decomposition device, and an operation control method for the above decomposition device.

2. BACKGROUND ART

Organic halogen compounds such as freon, trichloromethane and halon, which incorporate elements such as fluorine, chlorine and bromine within the molecule, are used in large quantities for a variety of uses such as refrigerants, solvents and fire extinguishing agents, and are extremely important in industry.

However, these compounds display high volatility, and if discharged untreated into the environment, such as into the atmosphere, soil, or water, can have undesirable effects on the environment such as the generation of carcinogenic substances or the destruction of the ozone layer. Consequently from an environmental conservation viewpoint, it is necessary to treat the compounds to render them harmless.

Conventional treatment methods for organic halogen compounds typically utilize thermal decomposition reactions at high temperatures. These treatment methods can be further roughly classified into incineration methods and plasma methods.

In incineration methods, organic halogen compounds are incinerated together with typical waste products such as plastics. In contrast, in plasma methods, the organic halogen compound is reacted with steam within a plasma, and decomposed to carbon dioxide, hydrogen chloride and hydrogen fluoride. In recent years, operation control methods have been developed for organic halogen compound decomposition devices which utilize the above plasma methods and which utilize microwaves to generate the plasma.

Decomposition devices used in such decomposition methods comprise an exhaust gas treatment tank containing an alkali solution, a reaction tube in which the open lower end section thereof is immersed in the alkali solution, a cylindrical waveguide which extends in a vertical direction above the reaction tube, a discharge tube disposed inside the cylindrical waveguide in which the bottom end thereof interconnects with the reaction tube, a square waveguide in which one end thereof is connected to the cylindrical waveguide, and a microwave transmitter which is installed at the other end of the square waveguide.

In this type of decomposition device, freon gas and steam are supplied to the discharge tube, while microwaves generated by the microwave transmitter are transmitted to the cylindrical waveguide via the square waveguide. Then, a discharge is produced within the microwave electric field formed inside the cylindrical waveguide, and the freon gas is decomposed by a thermal plasma within the reaction tube. The product gases produced by this decomposition reaction are then neutralized by passage through the alkali solution, and any remaining gases such as carbon dioxide are expelled through an exhaust duct.

However, in the above plasma type organic halogen compound decomposition device, prior to the formation of the plasma, it is first necessary to ignite the gas in a stable and reliable manner enabling a simple formation of the plasma. Furthermore, in terms of the operation of the device following ignition, maintenance of a good plasma form and maintenance of a stable decomposition reaction are important factors.

Moreover, in the above plasma type organic halogen compound decomposition device, because the freon gas or the like needs to be in a plasma state, the device needs to be controlled so that the freon gas is converted to a plasma in a stable and reliable manner. Furthermore, because the substances generated on decomposition of the freon gas are toxic, safety must also be ensured in the control of the device.

The present invention takes the above factors into consideration, with an object of providing a microwave plasma torch and an organic halogen compound decomposition device for which a stable and reliable ignition is possible prior to plasma formation, and moreover for which good plasma form, and stable operation, can be maintained following ignition.

Furthermore, another object of the present invention is to provide a plasma ignition method which enables a stable and reliable ignition prior to the plasma formation, and an organic halogen compound decomposition method which utilizes this ignition method.

Moreover, another object of the present invention is to provide an operation control method for an organic halogen compound decomposition device in which an organic halogen compound such as a freon gas can be converted to a plasma in a stable and reliable manner. In addition, another object of the present invention is to provide an operation control method for an organic halogen compound decomposition device which enables an improvement in safety of the organic halogen compound decomposition devices.

DISCLOSURE OF THE INVENTION

In order to resolve the above problems, the following construction was employed in the present invention.

A microwave plasma torch of the present invention comprises a cylindrical waveguide made up of an outer conductor and an inner conductor, and a dual construction discharge tube made up of an inner tube and an outer tube which is provided inside the cylindrical waveguide and on an identical axis, wherein a probe antenna formed from an extension of the inner conductor is positioned so as to encircle the discharge tube, and the tip of the inner tube is positioned further inwards than the tip of the probe antenna.

According to this microwave plasma torch, the helical gas flow flowing out from between the inner tube and outer tube forms a stagnation point directly below the inner tube. Consequently, the gas flow stagnation point can be easily ignited, making a stable and reliable ignition possible. Furthermore, because the tip of the inner tube is positioned further inwards than the tip of the probe antenna, the inner tube tip section is separated from the energy intensive section of the plasma, and is less likely to be subjected to heating effects.

Moreover, because a distance L is provided between the inner tube tip and the probe antenna tip, with the inner tube being positioned further inwards, the inner tube tip is separated from the energy intensive section of the plasma, and is less likely to be subjected to heating effects. Consequently, thermal deformation of the inner tube can be prevented, and by providing a stable gas flow, a stable decomposition reaction can be maintained.

Furthermore, an organic halogen compound decomposition device of the present invention comprises an exhaust gas treatment tank containing a treatment solution for neutralization treatment of the decomposition products from the organic halogen compound, a reaction tube in which the open lower end section thereof is immersed in the treatment solution of the exhaust gas treatment tank, and a microwave plasma torch, and the microwave plasma torch further comprises a cylindrical waveguide made up of an outer conductor and an inner conductor, which extends in a vertical direction above the reaction tube, and a dual construction discharge tube made up of an inner tube and an outer tube which is provided inside the cylindrical waveguide and on an identical axis, wherein a probe antenna formed from an extension of the inner conductor is positioned so as to encircle the discharge tube, and the tip of the inner tube is positioned further inwards than the tip of the probe antenna.

This organic halogen compound decomposition device employs a plasma torch which has excellent ignition properties and which is able to maintain a stable decomposition reaction, and so at the beginning of operation, a stable and reliable ignition is possible. Moreover, a good plasma form is maintained during operation, thereby enabling the maintenance of a stable decomposition reaction.

Furthermore, a plasma ignition method of the present invention is a plasma ignition method in which argon gas, which is introduced into a dual structure discharge tube comprising an inner tube and an outer tube and which flows in a swirling motion between the inner tube and the outer tube prior to plasma generation, is ignited to form a plasma, wherein the axial flow rate of the argon gas flowing between the inner tube and the outer tube is set to a value of at least 80 cm/second.

This plasma ignition method, by employing a dual structure discharge tube and using a high velocity argon gas axial flow rate of at least 80 cm/second, generates a suitable stagnation point in the gas flow in the lower section of the inner tube, and by conducting ignition at this stagnation point, a very high ignition ratio of greater than 90% is achieved at the time of plasma formation, making a stable and reliable ignition possible. Moreover, the aforementioned stagnation point maintains the plasma in a stable state even following ignition, and so also contributes to the maintenance of a good plasma.

Furthermore, an organic halogen compound decomposition method of the present invention is an organic halogen compound decomposition method which uses an organic halogen compound decomposition device comprising an exhaust gas treatment tank containing an alkali solution, a reaction tube in which the open lower end section thereof is immersed in the alkali solution, a cylindrical waveguide which extends in a vertical direction above the reaction tube, a dual structure discharge tube comprising an inner tube and an outer tube which is disposed inside the cylindrical waveguide and in which the bottom end thereof interconnects with the reaction tube, a square waveguide which extends horizontally and in which one end thereof is connected to the cylindrical waveguide, and a microwave transmitter which is installed at the other end of the square waveguide, and in which an organic halogen compound is reacted with steam inside the reaction tube and is decomposed by a plasma, wherein prior to formation of the plasma, the axial flow rate of the argon gas, which is introduced into the discharge tube and flows in a swirling motion between the inner tube and the outer tube, is set to a value of at least 80 cm/second, and the argon gas is then ignited to form the plasma.

This organic halogen compound decomposition method employs a stable and reliable ignition method, and so a very high ignition ratio of greater than 90% is achieved at the time of plasma formation, making a stable and reliable ignition possible. Furthermore, maintenance of the plasma following ignition is also easier, and so a stable decomposition reaction can be easily maintained.

Moreover, according to this organic halogen compound decomposition method, it is preferable that the aforementioned axial flow rate is set to a value of at least 230 cm/second.

According to this organic halogen compound decomposition method, by setting the axial flow rate at this higher velocity, the ignition ratio reaches 100%, making an even more stable and reliable ignition possible.

Furthermore, an operation control method for an organic halogen compound decomposition device according to the present invention is an operation control method for an organic halogen compound decomposition device in which an organic halogen compound is converted to a plasma and reacted with water to decompose the organic halogen compound, wherein a rare gas and then the organic halogen compound are supplied in sequence to the device system, and the rare gas is converted to a plasma before supply of the organic halogen compound is commenced, and following commencement of the supply of the organic halogen compound, supply of the rare gas is stopped.

According to this operation control method for an organic halogen compound decomposition device, first a rare gas which is easily converted to a plasma state, such as AR, NE or He, is converted to a plasma, and an organic halogen compound is subsequently supplied and the organic halogen compound also converted to a plasma. Then, once the plasma state of the organic halogen compound has stabilized, the supply of the rare gas is stopped. That is, according to this operation control method for an organic halogen compound decomposition device, a time overlap in the supply of the rare gas and the organic halogen compound can be provided, and as a result, the plasma of the organic halogen compound can be generated in a stable and reliable manner, and moreover consumption of the rare gas can be limited. The time overlap in the supply of the rare gas and the organic halogen compound may be extremely short. Consequently, during the long period of the organic halogen compound decomposition, the supply of the rare gas is unnecessary.

Moreover, according to this operation control method for an organic halogen compound decomposition device, it is preferable that the conversion to plasma is performed by irradiation with microwaves.

In comparison with high frequency induction plasmas, plasmas generated by microwave irradiation have more stable plasma flames. Consequently, even if supply of the rare gas, which is readily converted to a plasma, is stopped, there is almost no effect on the conversion of the organic halogen compound to plasma form. As a result, once the conversion to plasma of the organic halogen compound has stabilized, even if supply of the rare gas is stopped the organic halogen compound can still be converted to a plasma state in a stable and reliable manner.

In addition, according to this operation control method for an organic halogen compound decomposition device, supply of water should preferably be commenced after supply of the rare gas, and before supply of the organic halogen compound is commenced.

In this method, first supply of the rare gas which is readily converted to a plasma is commenced, and the rare gas converted to a plasma. Then, an organic halogen compound to undergo decomposition is supplied to the device system, and by reacting the organic halogen compound in a plasma state with steam, acidic gases are generated as decomposition products, although supply of the water must be commenced prior to supply of the organic halogen compound. The reason for this requirement is that if only the organic halogen compound is converted to a plasma state, then recombination of dissociated atoms generates unexpected toxic halogen compounds, making it impossible to conduct processing to render the products harmless. In other words, with this method, because water is present before the decomposition of the organic halogen compound commences, the organic halogen compound and the water react, enabling the organic halogen compound to be decomposed safely. Furthermore, because the water supply is started after the rare gas supply, the inside of the device system can be kept dry, thereby enabling the ignition to be stabilized.

In addition, according to this operation control method for an organic halogen compound decomposition device, it is preferable that prior to commencement of the supply of the rare gas, a moisture removal treatment is performed on the inside of the device system.

During operation of the organic halogen compound decomposition device, if residual moisture is present inside the device system, then ignition of the plasma will not be stable. Consequently, by removing any moisture from within the device system before plasma ignition, ignition of the plasma can be performed in a stable and reliable manner.

In such a case, the moisture removal process performed on the inside of the device system to ensure stabilization of the plasma ignition should preferably be conducted by supplying a gas to the system. In particular, by for example, heating the supplied gas to a temperature of 100~800° C., or drying the gas, any residual moisture inside the system can be effectively removed.

Moreover, according to this operation control method for an organic halogen compound decomposition device, it is preferable that following the stopping of the supply of the organic halogen compound, a scavenging gas is supplied into the device system.

By passing a scavenging gas through the device system following the stopping of the supply of the organic halogen compound, that is, following completion of the decomposition of the organic halogen compound, any residual acidic gases produced as decomposition products inside the system are purged, thereby improving the safety of the system.

Furthermore, an operation control method for an organic halogen compound decomposition device according to the present invention is an operation control method for an organic halogen compound decomposition device in which an organic halogen compound is decomposed by conversion to a plasma and subsequent reaction with water, wherein decomposition treatment of the organic halogen compound is performed following treatment to remove moisture from within the device system.

According to this operation control method for an organic halogen compound decomposition device, by removing any moisture from inside the device system, which is a major cause of instability in the plasma ignition, before decomposition treatment of the organic halogen compound is commenced, the plasma ignition can be conducted in a stable and reliable manner.

Furthermore, an operation control method for an organic halogen compound decomposition device according to the present invention is an operation control method for an organic halogen compound decomposition device in which an organic halogen compound is decomposed by conversion to a plasma and subsequent reaction with water, wherein following completion of the decomposition treatment, a scavenging gas is supplied into the device system.

According to this operation control method for an organic halogen compound decomposition device, by supplying a scavenging gas into the device system following completion of the decomposition of the organic halogen compound, any residual acidic gases inside the system are purged, thereby improving the safety of the system.

Moreover, in the aforementioned operation control method for an organic halogen compound decomposition device, it is preferable that during decomposition of the organic halogen compound, the treatment solution used for neutralizing the decomposition products from the organic halogen compound is stirred, and that following completion of the decomposition, the stirring is stopped.

Stirring the treatment solution during decomposition of the organic halogen compound, facilitates the treatment of decomposition products. Furthermore, stopping the stirring following completion of the decomposition, allows reaction products within the treatment solution to settle, and also contributes to power conservation. Moreover, commencement and stopping of the stirring process need not necessarily match the commencement and stopping of the decomposition process.

BRIEF DESCRIPTION OF THE DRAWINGS

FIG. 7 is a table of experimental results showing the relationship between the axial flow rate V and the ignition ratio.

BEST MODE FOR CARRYING OUT THE INVENTION

Embodiments

As follows is a description of embodiments of the present invention with reference to FIG. 1 through FIG. 7.

Figure 1:
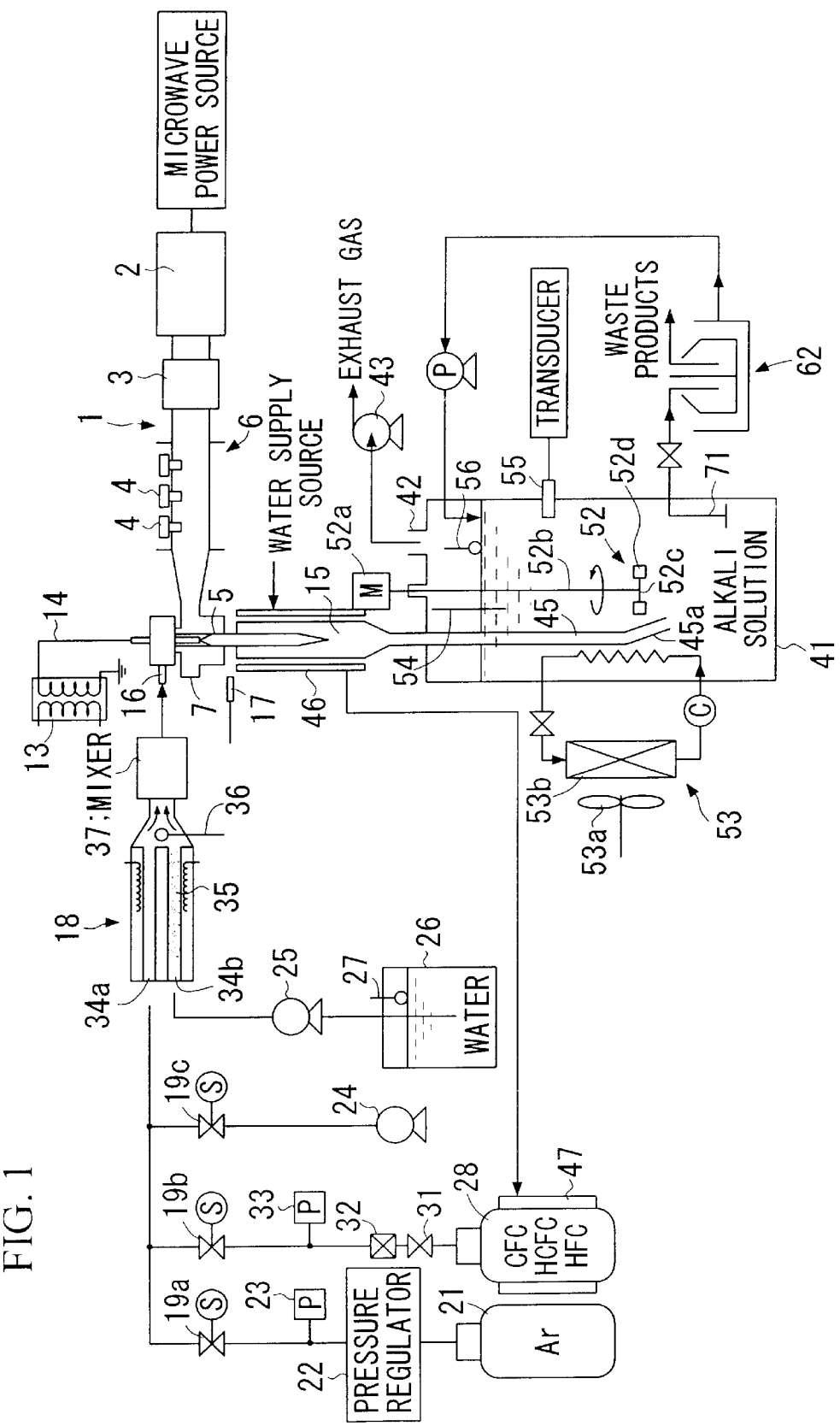
FIG. 1 is a system schematic diagram showing an embodiment of an organic halogen compound decomposition device according to the present invention.

A sample organic halogen compound decomposition device according to the present invention is shown in FIG. 1 through FIG. 4. In FIG. 1 a square waveguide 1, which extends out in a horizontal direction, is provided with a microwave transmitter 2 for transmitting microwaves of frequency 2.45 GHz at the beginning end section (the right hand end section) thereof, and microwaves are transmitted from the beginning end section towards the finishing end (left).

As shown in FIG. 1, the square waveguide 1 is provided with an isolator 3 which by absorbing microwaves which are reflected by the finishing end section and are returned towards the beginning end section, prevents any effect the reflected waves may have on the microwave transmission, and a tuner 6 which by passing an electric wave through a plurality of wave motion regulation members 4, regulates the wave motional mismatching in the electric wave and converges the electric wave into the discharge tube 5.

As follows is a detailed description of the above operation.

The microwave transmitter 2 drives a magnetron positioned at one end of the waveguide of rectangular cross-section, and reflects an electromagnetic wave of a predetermined frequency. The characteristics of the propagation phenomenon of this electromagnetic wave can be grasped by solving the Maxwell wave equation of the electromagnetic wave, and as a result, an electromagnetic wave TE with no electric field component in the direction of propagation can be transmitted.

An example of the primary component $TE_{10}$ of this wave is shown as arrows of alternating direction in the transmission direction of the square waveguide of FIG. 2(a). Furthermore, at the other end section of the square waveguide 1, in the circular cavity of a dual cylindrical waveguide comprising two cylindrical conductors, a TM wave with an electrical field component in the direction of the wave motion is generated in the circular cavity by a coupling operation, via the conductor 9, of the electromagnetic wave propagated through the square waveguide 1 and the electromagnetic wave reflected by the end of the waveguide.

The primary component $TM_{10}$ of this wave is also shown as arrows in the circular cavity section of FIG. 2(a).

Minor adjustments of the propagation of the wave motion of the electromagnetic wave arising from secondary high frequencies or higher are performed by the tuner 4.

The isolator 3 prevents any fundamental damage to the transmitter 2.

A cylindrical waveguide 7 comprises an outer conductor 8 and an inner conductor 9 of narrower diameter, as shown in FIG. 2(a), and is interconnected with the square waveguide 1 in the vicinity of the finishing end section of the square waveguide 1, and extends in a vertical direction.

The inner conductor 9 is fixed in a position at the top of the square waveguide 1 surrounding a quartz discharge tube 5, and extends in the direction of the end plate 8A of the outer conductor 8. This extended section functions as a probe antenna 9a.

A dual structure comprising an inner tube 11 and an outer tube 12 is used for the discharge tube 5, and the area between the inner tube 11 and the outer tube 12 functions as a gas flow passage. This type of dual tube discharge tube 5 is positioned inside the cylindrical waveguide 7 about the same central axis as the waveguide 7. Hereafter, in this invention, the combination of the cylindrical waveguide 7 and the discharge tube 5 will be called a microwave plasma torch (or abbreviated to a plasma torch). Furthermore, a Tesla coil 14, which is heated by an ignition device 13, is inserted inside the inner tube 11 of the discharge tube 5.

Moreover, the tip (lower end) of the inner tube 11 is positioned at a location which is recessed a predetermined distance L inside (upwards from) the tip of the probe antenna 9a which extends down from the inner conductor 9 and encircles the discharge tube 5 (refer to FIG. 2(b)).

In cases where ignition is the priority, this distance L would be best set to L=0, so that the tip of the probe antenna 9a and the tip of the inner tube 11 coincide. However, if L is set at a value of L=0, then the tip section of the inner tube 11 is exposed to the energy intensive section of the plasma simultaneously with ignition, and so continued operation leads to melt deformation of the inner tube due to heating effects. If melt deformation occurs at the tip section of the inner tube 11, then the gas flow from the space between the inner tube 11 and the outer tube 12 becomes unstable leading to a marked deformation in the form of the plasma. As a result, the decomposition reaction may become unstable, or heating effects from the deformed plasma may lead to damage of the outer tube 12.

However as described above, in the present invention, the tip section of the inner tube 11 is lifted, and a distance L provided between the tip section of inner tube 11 and the tip section of the probe antenna and 9a, and consequently the tip section of the inner tube 11 is removed from the energy intensive section of the plasma and is unaffected by any heating effect. Furthermore, in terms of preventing heating effects, the greater the distance L the better, although this results in an equivalent shortening of the distance for creating the rotational gas flow, and so it is necessary to adopt a balance, within a limited space, between limiting the heating effects and ensuring good rotational gas flow formation.

In contrast, if the tip of the inner tube 11 is extended and protrudes out below the tip of the probe antenna 9a, then the tip is heavily affected by heating effects, and consequently such situations are undesirable.

The tip section of the outer tube 12 penetrates through the end plate 8A of the outer conductor 8 and interconnects with the copper reaction tube 15, and furthermore the base part (upper part) of the outer tube 12 is positioned so that a spacing is maintained from the inner conductor 9.

Numeral 17 represents an optical sensor which is directed at the exposed section of the outer tube 12 between the end plate 8A of the outer conductor 8 and the reaction tube 15. The optical sensor 17 monitors the formation state of the plasma by detecting optical intensity.

Furthermore, a gas supply tube 16 is inserted into the aforementioned spacing, at a tangential direction to the entrance to the circular passage formed by the outer tube 12 and the inner tube 11. Argon gas (rare gas), freon gas (organic halogen compound), air, and steam are supplied to the circular passage of the discharge tube 5 through this gas supply tube 16. The argon gas, freon gas, and air are passed selectively from the respective supply sources to a heater 18, via the opening and closing of electromagnetic valves 19a, 19b, and 19c respectively, shown in FIG. 1.

Argon gas is supplied to the system prior to plasma generation to ease the ignition process, and is stored in an argon gas bottle 21. Needless to say, other rare gases such as helium or neon may also be used in place of the argon gas. Furthermore, a pressure regulator 22 and a pressure switch 23 are provided between the argon gas bottle 21 and the electromagnetic valve 19a.

Air is supplied to the system to remove any residual moisture from within the system and improve the stability of the ignition, as well as to expel any residual gas from the system, and is supplied from an air compressor 24. Air, nitrogen gas, or argon gas or the like may be used.

Steam is necessary for the decomposition of the freon gas, and is generated by using a plunger pump 25 to pass water from a reservoir tank 26 through to the heater 18. A level switch 27 is provided in the reservoir tank 26 for detecting variations in the water level.

Freon gas is stored as a liquid in a recovered freon gas bottle 28, and a diaphragm device 31, a mist separator 32, and a pressure switch 33 are provided between the recovered freon gas bottle 28 and the electromagnetic valve 19b.

The diaphragm device 31 is provided for fixing the quantity of gas flow, and is constructed, for example, from a combination of a capillary tube and an orifice.

The mist separator 32 is provided for removing oils (lubrication oils) and moisture incorporated within the freon gas, and may utilize a collision type system or a centrifugal separation type system.

The heater 18 is used not only for generating the steam for reaction with the freon gas, but is also used to preheat the freon gas and the like, thereby preventing problems such as the steam being cooled inside the device by contact with the freon gas and recondensing. A variety of heating methods may be used such as electrical heating or steam heating.

Two parallel passages 34a, 34b are provided inside the heater 18. Freon gas, argon gas, and air are introduced into one of the passages 34a, while water from the reservoir tank 26 is introduced into the other passage 34b and converted to steam.

A resistor 35 is used to fill the passage 34b in which the steam is generated, in order to apply resistance to the steam passing through the passage 34b, thereby preventing the steady flow of steam through the passage. Examples of suitable materials for the resistor 35 include inorganic or organic granules, fibers, or porous materials, or molded products of these materials, but from the viewpoint of preventing deterioration of the material under conditions of high temperature, inorganic materials, including oxides such as $SiO_2$, $Al_2O_3$, $TiO_2$, $MgO$ and $ZrO_2$, carbides, and nitrides and the like, are preferable.

A thermocouple 36 is provided near the exit of the heater 18.

The freon gas and the steam which have passed through the heater 18 are mixed inside a mixer 37, and then pass through the gas supply tube 16 and into the discharge tube 5.

Figure 4:
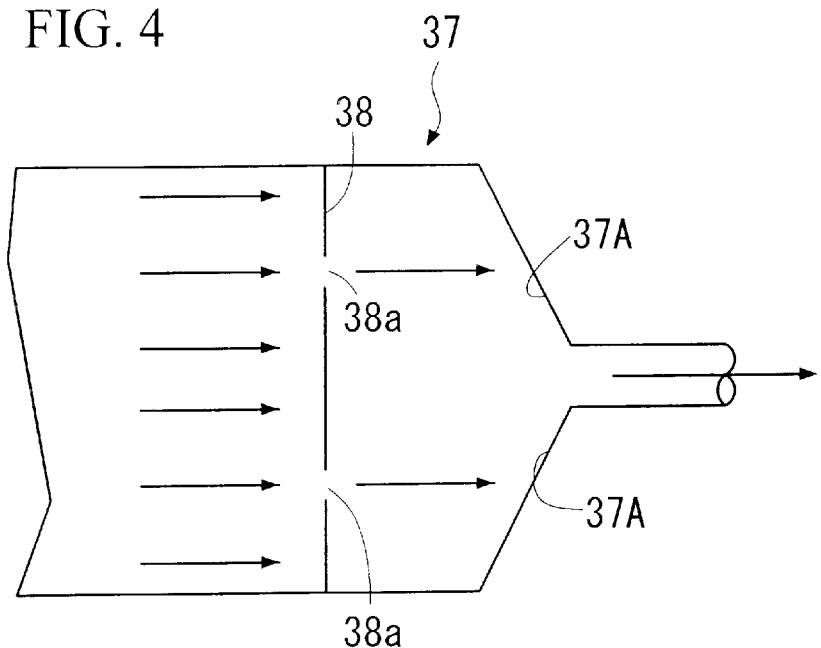
FIG. 4 is a cross-sectional diagram of the essential sections of the mixer provided in the decomposition device shown in FIG. 1.

As is shown in FIG. 4, an orifice 38 is provided inside the mixer 37, and the aperture 38a of the orifice is set at a diameter of 0.1 mm~5 mm. Furthermore, the exit end face 37A of the mixer 37 which faces the aperture 38a is sloped so that the flow passage cross-section gradually narrows.

An exhaust gas treatment tank 41 is provided for neutralizing acidic gases (hydrogen fluoride and hydrogen chloride) generated on decomposition of the freon gas and thereby rendering the product gases harmless, and is filled with an alkaline suspension of calcium hydroxide in water.

For example, in the case where the freon gas for decomposition is the refrigerant freon R12 recovered from a disposed refrigerator, then product gases generated by the decomposition reaction shown in equation 1, are rendered harmless by the neutralization reactions shown in equation 2.

$$CCl_2F_2 + 2H_2O \rightarrow 2HCl + 2HF + CO_2 \quad \text{(Equation 1)}$$

$$2HCl + Ca(OH)_2 \rightarrow CaCl_2 + 2H_2$$

$$2HF + Ca(OH)_2 \rightarrow CaF_2 + 2H_2O \quad \text{(Equation 2)}$$

The neutralized products (calcium chloride and calcium fluoride) generated by the neutralization reactions of equation 2 are not very soluble, and although a portion will dissolve in the alkali solution, the majority forms a slurry.

Furthermore, the carbon dioxide generated by the decomposition reaction of equation 1, and any remaining acidic gases, which have been reduced by the neutralization reactions of equation 2 to a minute volume lower than the emission standards, are discharged from the system through an exhaust duct 42 connected to the upper surface of the exhaust gas treatment tank 41, using a blower 43.

Inside the exhaust gas treatment tank 41, a blow tube 45, which is connected to the reaction tube 15 by an exchangeable coupling 44, extends down in a vertical direction, with the lower section thereof immersed in the alkali solution. Furthermore, the tip section 45a of the blow tube 45 is tilted at a predetermined angle with respect to the vertical.

A condenser 46 equipped with tubing for cooling water (not shown in the drawings) is installed around the intermediate section of the reaction tube 15 in an axial direction, so as to surround the periphery of the reaction tube 15. The condenser 46 cools the product gases generated by the decomposition reaction of equation 1, but in order to prevent recondensation of residual steam within the reaction tube 15, the condenser is controlled so that the steam is not cooled below the dew point. In the case of this embodiment, the product gases are cooled to approximately 400° C.

Furthermore, the cooling water (hot water) from the condenser 46 which has been warmed by cooling the reaction tube 15 is used as the heating source for the recovered freon gas bottle 28. That is, a heater 47 equipped with tubing for hot water (not shown in the drawings) is installed around the periphery of the recovered freon gas bottle 28, and the recovered freon gas bottle 28 is then heated by passing the water used to cool the reaction tube 15 through this hot water tubing.

Figure 2:
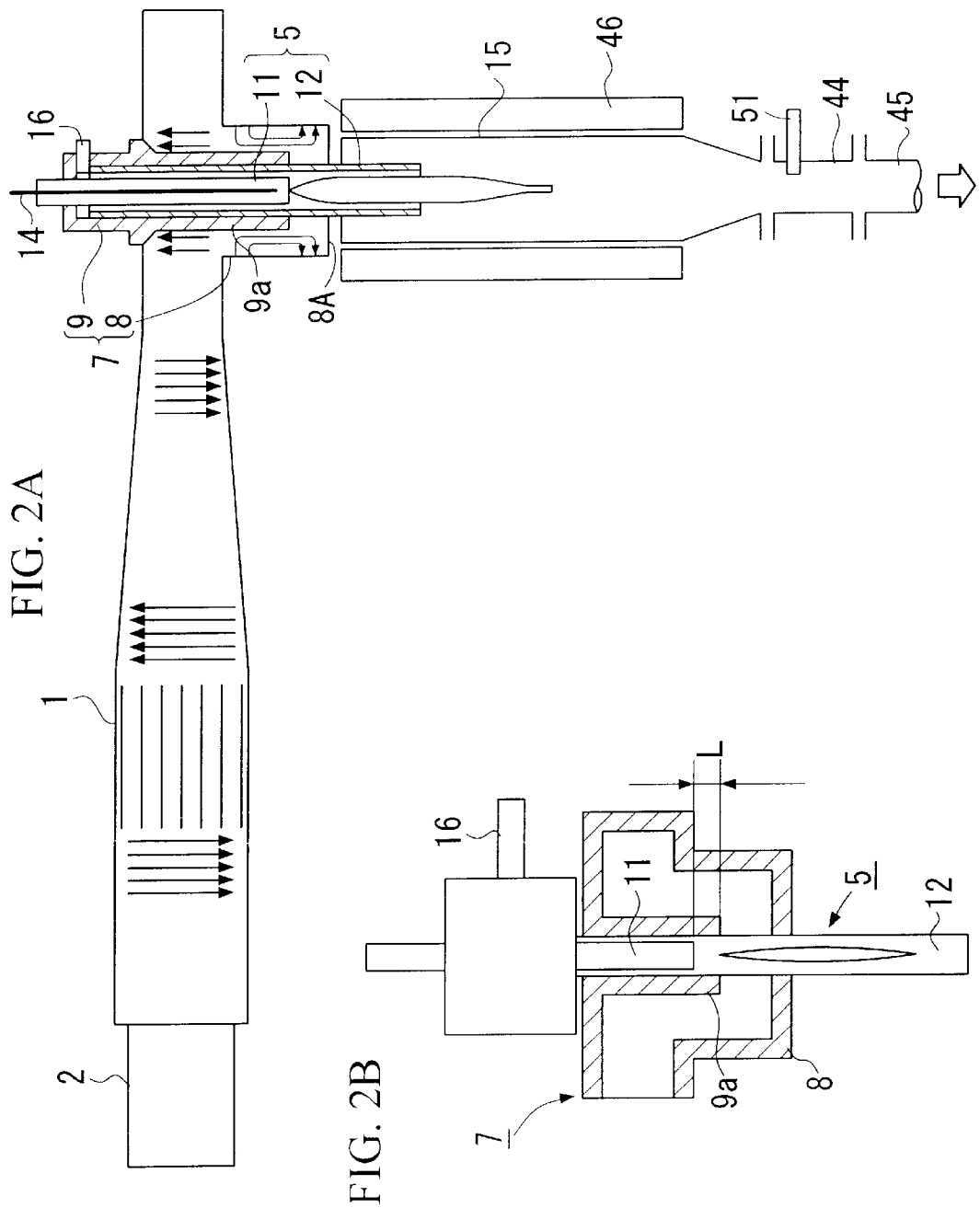
FIG. 2(a) is an enlargement of essential sections of the decomposition device shown in FIG. 1.
FIG. 2(b) is an explanatory diagram showing an outline of the microwave plasma torch section of the decomposition device shown in FIG. 1.
Figure 3:
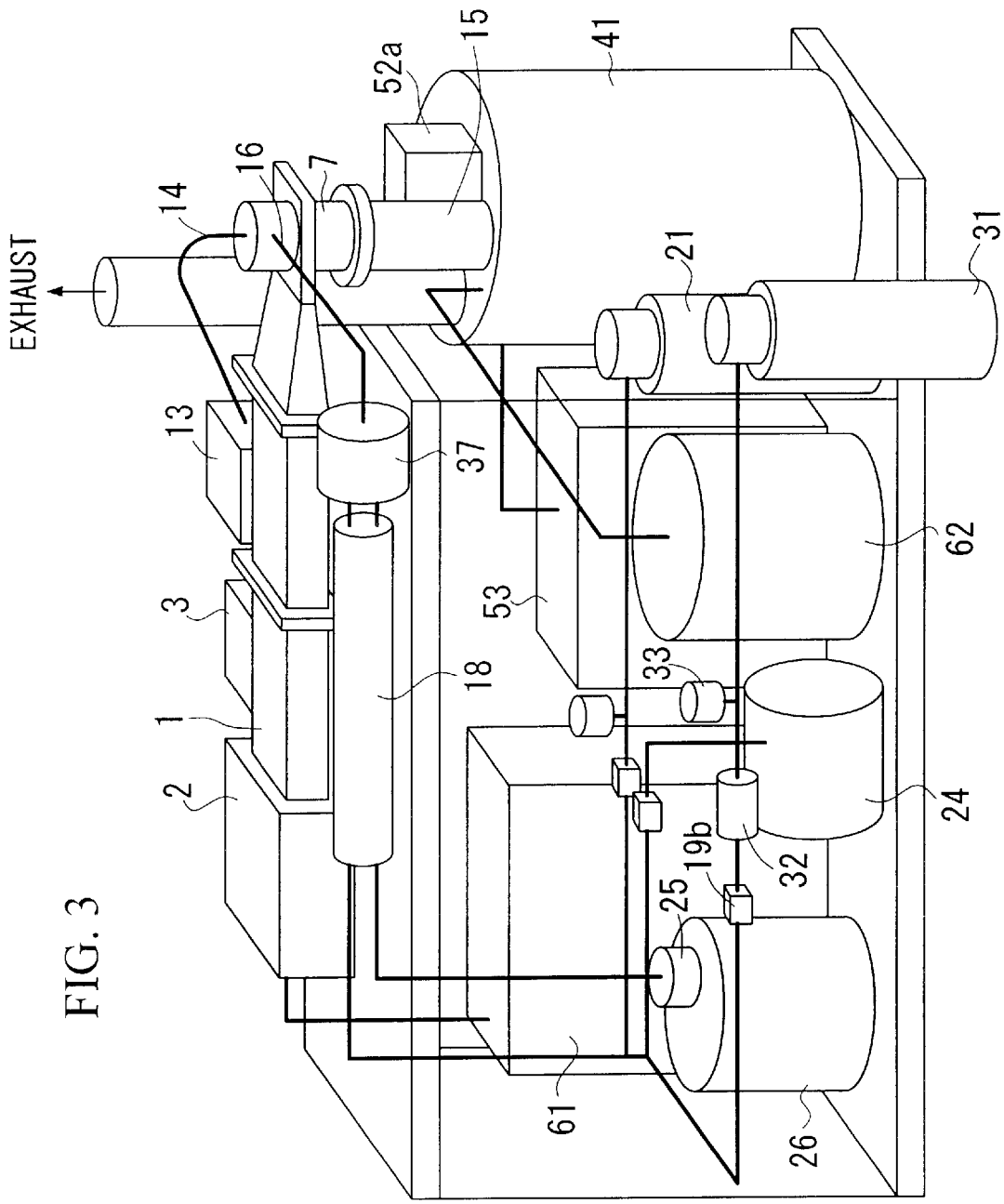
FIG. 3 is a perspective view from above showing the overall construction of the decomposition device shown in FIG. 1.

The exchangeable coupling 44 is connected between the reaction tube 15 and the blow tube 45 in a detachable manner, as shown in FIG. 2, and an injection nozzle 51 is directed inside the exchangeable coupling. Cooling water is discharged from the injection nozzle 51, thereby rapidly cooling the plastic (teflon for example) blow tube 45 to a temperature within the heat resistance temperature range thereof. In those cases where the blow tube is made of teflon, the temperature is cooled to below 100° C.

The reason for using a blow tube 45 made of plastic is that the blow tube 45 needs to display good corrosion resistance with respect to both the acidic solution generated by dissolution of the acidic gases in cooling water, and the alkali solution inside the exhaust gas treatment tank 41, and such corrosion resistance is difficult to obtain with metals. In contrast, in the case of the reaction tube 15, because the inside is always maintained in a dry state, there is little danger of corrosion resulting from an acidic solution generated by dissolution in water of the acidic gases generated by the decomposition reaction of equation 1. Indeed, the reaction tube 15 needs to display good heat resistance with respect to the high temperature plasma and decomposition gases, and consequently constructing the reaction tube 15 of copper produces a long life tube.

The product gases from the decomposition reaction of equation 1 are discharged from the tip (bottom end) of the blow tube 45 and form gas bubbles in the alkali solution. The neutralization reaction within the alkali solution will proceed more rapidly if the contact surface area between the gas bubbles and the alkali solution is large, and the time taken for the gas bubbles to reach the surface of the solution is long, and consequently a gas bubble fragmentation device 52 is provided inside the exhaust gas treatment tank 41 for finely fragmenting the gas bubbles and thereby promoting the neutralization reactions of equation 2.

The gas bubble fragmentation device 52 comprises an axial section 52b which is rotated by a motor 52a, a disc shaped blade retention section 52c fixed to the tip of the axial section 52b, and a series of six blades 52d fixed around the periphery of the blade retention section 52c. The axial section 52a, the blade retention section 52c, and the blades 52d are all constructed of stainless steel, and the blades 52d cross the plane of the blade retention section 52c and are fixed at equal intervals around the circumference of the blade retention section 52c using silver soldering. The reason for using silver soldering for fixing the blades 52d and the blade retention section 52c, is that normal welding is corroded badly by alkali solutions.

The gas bubble fragmentation device 52 is positioned with the center of the blade retention section 52c sitting above the tip of the reaction tube 15, and gas bubbles floating up from the tip of the reaction tube 15 hit the blades 52d, which are being rotated at 300 rpm, and are fragmented into fine gas bubbles with a diameter of between 3 mm~5 mm.

Furthermore, by stirring the calcium hydroxide powder inserted in the exhaust gas treatment tank 41, the gas bubble fragmentation device 52 also performs the role of creating a suspension between the water and the insoluble calcium hydroxide.

The gas bubble fragmentation device 52 is maintained in an operational state from commencement of the operation of the plasma decomposition device until completion of the operation. At times outside of the operation period of the plasma decomposition device, the gas bubble fragmentation device 52 is stopped.

Because the neutralization reactions of equation 2 are exothermic reactions, a cooler 53 is provided inside the exhaust gas treatment tank 41 for cooling the temperature of the exhaust gas treatment tank 41 to a temperature below the heat resistant temperature of the blow tube 45. The cooler 53 is constructed by inserting a portion of tubing, which is connected to a radiator section 53b which is in turn cooled by a fan 53a, inside the exhaust gas treatment tank 41. Then, by passing a coolant such as water through this tubing, heat from the exhaust gas treatment tank 41 is absorbed, and this heat is then radiated by the radiator section 53b. The temperature inside the exhaust gas treatment tank 41 is detected by a thermocouple 54.

Moreover, a pH sensor 55 is also provided in the exhaust gas treatment tank 41. The pH value of the alkali solution is monitored continually by a control device 61 via the pH sensor 55, and if the pH value drops to 9 for example (pH 11~12 at the commencement of operations), then a warning device is activated by a command from the control device 61, and the decomposition operation is stopped. The warning device can be any device which attracts outside attention, and for example a flashing lamp or a warning alarm may be used.

The slurry inside the exhaust gas treatment tank 41 gradually increases as the operating time lengthens, and so following the stopping of operations, the slurry and the alkali solution are placed in a solid-liquid separator 62, and following separation of the solid and liquid, the solid is either disposed of as waste, or put to other uses. Furthermore, the separated alkali solution is returned to the exhaust gas treatment tank 41 and reused.

The solid-liquid separator 62 and the exhaust gas treatment tank 41 are connected by a discharge tube 71, and one end of the discharge tube 71 is positioned in the lower portion of the exhaust gas treatment tank 41, with the opening of the discharge tube facing downward. Moreover an end plate is provided at the tip of the discharge tube, so that during slurry discharge, the alkali solution layer from the upper portion of the tank is not discharged along with the slurry. Furthermore, fluctuations in the liquid level inside the exhaust gas treatment tank 41 are detected by a level switch 56.

Figure 5:
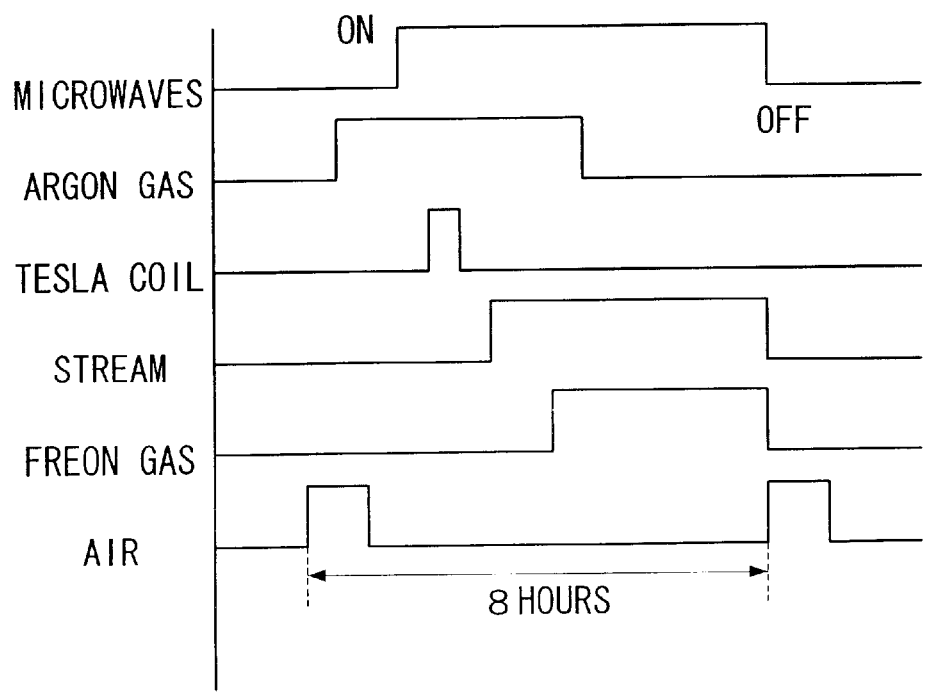
FIG. 5 is a diagram showing a sample timeline for the supply of microwaves and argon gas and the like, as well as the ignition time, in the decomposition device of FIG. 1.

In an organic halogen compound decomposition device of the construction described above, the operations for opening and closing the electromagnetic valves, and the operation for igniting the Tesla coil 14, are controlled by the control device 61 in the manner shown in FIG. 5.

Figure 6:
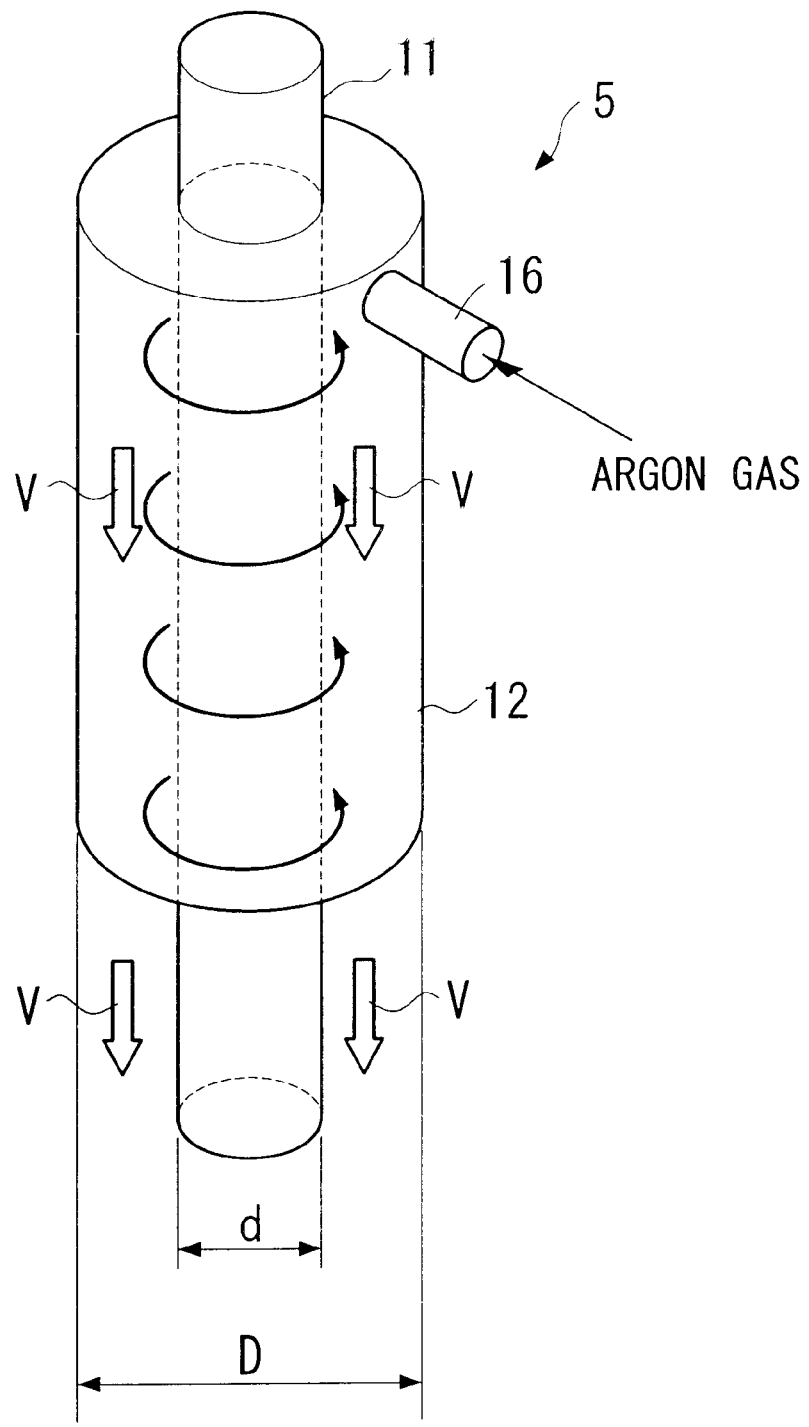
FIG. 6 is an explanatory diagram of a plasma ignition method according to the present invention.

As is evident from FIG. 5, freon gas decomposition within the decomposition device is conducted via a batch treatment where one cycle requires eight hours. Namely, before supply of the freon gas and steam is commenced, first air is supplied to the device for a predetermined time period (3 minutes) to remove any residual moisture, and following the stopping of the air supply, argon gas supply is commenced in order to improve the safety of the ignition process. As is shown in FIG. 6, the argon gas is supplied from the gas supply tube 16 to the space between the inner tube 11 and the outer tube 12, and flows in a downward direction while circulating around the periphery of the inner tube 11. In such a case, the average velocity of the argon gas flowing in a downward direction parallel to the axes of the inner tube 11 and the outer tube 12, as shown by the white arrows in the drawing, that is, the axial flow rate V, is set to a value of at least 80 cm/second.

Setting this axial flow rate V to a value of at least 230 cm/second is even more desirable. However, if the flow rate is raised to a level which is higher than necessary, then the flow volume of argon gas increases and leads to unnecessary gas consumption, which is undesirable from an economic viewpoint.

Then, while the argon gas is being supplied, microwaves are transmitted and ignition conducted via the Tesla coil 14, and supply of steam and the freon gas is also commenced. The supply of argon gas is then stopped. Moisture removal may also be conducted by drying the air.

Following the stopping of the decomposition operation, air is supplied to the system as a scavenging gas for a predetermined time (5 minutes), in order to maintain the safety of the system, and any residual acidic gases are purged.

The purged acidic gases are neutralized in the exhaust gas treatment tank 41. At this point, by having the gas bubble fragmentation device 52 activated, the treatment solution is stirred, thereby promoting the neutralization process.

Subsequently, the purging is stopped and the operation of the decomposition device is completed. The monitor 52a is stopped at the same time, as is the operation of the gas bubble fragmentation device 52. Stopping the gas bubble fragmentation device 52 also stops the stirring of the exhaust gas treatment tank 41, and the slurry within the exhaust gas treatment tank 41 settles out.

In the procedure described above, there is an overlap in time in the supply of the argon gas and the supply of the freon gas, but the time period between the commencement of the freon gas supply and the stopping of the argon gas supply may be short. The reason for this is that provided the ignition state is stable, there is no necessity to continue with the supply of the argon gas, and furthermore from the viewpoint of lowering costs, it is preferable to minimize the consumption of argon. In particular, in comparison with other plasmas, for example high frequency induction plasmas, because the stability of the plasma generated by microwaves is high, the stopping of the argon gas supply has almost no effect on the conversion of the freon gas to plasma form.

Furthermore, the control device 61, by receiving signals from the various sensors such as the pressure switches 32, 33, the thermocouples 36, 54, the level switches 27, 56, and the optical sensor 17, continuously monitors the supply pressure of the argon gas and the freon gas to the heater 18, the liquid level inside the reservoir tank 26, the formation state of the plasma, and the temperature and liquid level inside the exhaust gas treatment tank 41, and if any of these values moves outside the specified values, operation of the system is stopped, as there is a danger that the operation is not proceeding normally or efficiently.

Then, following the stopping of the operation, in order to ensure safety, air is supplied to the system in the manner described above, and any residual gas within the device is scavenged.

As follows is a description of the action of a decomposition device of the construction described above.

In the decomposition device, first the electromagnetic valves 19a, 19b are closed and the electromagnetic valve 19c is opened, and air from the air compressor 24 is supplied to the discharge tube 5 via the gas supply tube 16 for a period of three minutes. This air is heated to a temperature of 100~180° C. by passage through the heater 18. Consequently, any residual moisture inside the device is removed efficiently, thereby improving the stability of the ignition process.

Next, the electromagnetic valve 19c is closed and the electromagnetic valve 19a opened, and argon gas is supplied to the discharge tube 5. At this time, the argon gas is supplied from a direction tangential to the outer tube 12 and flows down through the dual structure discharge tube 5 with a helical pattern, and so a stagnation point is formed in the vicinity of the tip of the inner tube 11, easing the ignition process, and moreover simplifying the maintenance of the plasma following ignition. This type of stagnation point is most suited to the ignition process when the axial flow rate V is at least 80 cm/second.

The table of FIG. 7 represents experimental results showing the relationship between the axial flow rate V of the argon gas, and the ignition ratio. In the experiments, the axial flow rate V of the argon gas which circulates around the space between the inner tube 11 and the outer tube 12 was varied, and the respective ignition ratios investigated. Furthermore in the table, experimental results are shown for a case 1 to a case 3 for each experiment, in which different combinations of outer diameter d of the inner tube 11 and inner diameter D of the outer tube 12 were used.

According to the experimental results, in all three cases, including case 1, where the inner tube external diameter was 6 mm and the external tube inner diameter was 10 mm, case 2, where the inner tube external diameter was 6 mm and the external tube inner diameter was 13 mm, and case 3, where the inner tube external diameter was 8 mm and the external tube inner diameter was 13 mm, at low axial flow rates V of less than 80 cm/second, the ignition ratio was low and did not reach 90%, and was judged as being an unstable ignition for practical purposes. Furthermore if the axial flow rate V of the argon gas is low, then the quartz discharge tube 5 is more likely to be exposed to the heating effects of the plasma, which was confirmed as leading to a higher incidence of damage resulting from melt deformation.

In contrast, when the axial flow rate V is at least 80 cm/second, the ignition ratio was at least 90% in all three cases, and a stable and reliable ignition was confirmed as being possible. The reason for this increase in ignition ratio at this type of flow rate is thought to be due to the formation of the stagnation point in the argon gas below the inner tube 11, with the heated Tesla coil 14 igniting this stagnated gas. Moreover, the increase in ignition ratio is also thought to be due to simplifying the maintenance of a plasma with a suitable stagnation point.

Furthermore, if the axial flow rate V is of a high velocity of at least 230 cm/second, then the ignition ratio was confirmed as being 100% in all three cases, and the stability and reliability of the ignition was extremely high. The reason for this increase in ignition ratio is thought to be due to the formation of an even more suitable stagnation point at these higher axial flow rates V.

In the experiments, 850 cm/seond was set as the upper limit for the axial flow rate V, because provided a good ignition ratio is obtainable, then minimizing the argon gas consumption is more economical, and there is no necessity to increase the flow rate and the flow volume (consumption volume) excessively.

Furthermore, the gas supply volume is set to a value between 4~40 l/min, with values of at least 12 l/min being preferable. Within this set range, a plasma with an effective stagnation point is easier to maintain, and the discharge tube 5 is less likely to be affected by heat from the plasma, effectively preventing melt deformation and damage to the discharge tube 5. Moreover, because a distance L is provided between the tip of the inner tube 11 and the tip of the probe antenna 9a, the discharge tube 5 is less likely to be exposed to the heating effect of the plasma, thereby effectively preventing melt deformation and damage to the discharge tube 5.

Then, following a constant interval after the commencement of the argon gas supply, microwaves are transmitted from the microwave transmitter 2. The microwaves are transmitted by the square waveguide 1 to the finishing end section of the square waveguide 1, and then to the cylindrical waveguide 7.

At this point, a $TM_{01}$ mode of large field intensity is formed as the electrical field in the cylindrical waveguide 7, and moreover because the electric field mode inside the square waveguide 1 and the electric field mode inside the cylindrical waveguide 7 are coupled via the inner conductor 9, the electric field inside the cylindrical waveguide 7 is stable. Of course, a magnetic field develops in a direction orthogonal to the electric field. This oscillating electromagnetic field causes gases introduced into the discharge tube 5 to be heated up into a plasma state.

Next, a high voltage is applied to the Tesla coil 14 connected to the ignition device 13, and a spark discharge is generated between the coil and the inner conductor 9 causing ignition. At this point, moisture has been removed from inside the discharge tube 5 and the readily ignitable argon gas has been introduced in advance, and so ignition occurs easily.

Water is then sucked up from the reservoir tank 26 with the plunger pump 25 and passed through the heater 18, and the generated steam supplied to the discharge tube 5.

Following commencement of the steam supply, supply of the freon gas is commenced in the manner described below, but the reason for first supplying the steam is as follows. In an operation control method of an organic halogen compound decomposition device according to the present invention, freon gas and steam are supplied at a constant molar ratio, and subsequent decomposition and reaction generates acidic gases. The reason for using this method is that if only the freon is converted to a plasma state, then recombination of dissociated atoms will generate unexpected toxic halogen compounds, making it impossible to conduct processing to render the products harmless.

Consequently, by first supplying steam to the discharge tube 5, and then supplying the freon gas, and conducting the freon decomposition in the presence of steam in the manner described above, the freon can be decomposed safely.

Furthermore, because the steady circulation of steam is prevented by the resistor 35 packed inside the heater 18, a constant volume of steam will always exist inside the heater 18. Consequently, splashing resulting from surging and bumping is prevented, and the flow volume of steam is stabilized, enabling flow volume fluctuations at the upstream end of the mixer 37 to be suppressed effectively.

As a result, the plasma is stabilized without any danger of the plasma being extinguished, thereby enabling an improvement in processing capacity.

Next, the electromagnetic valve 19b is opened, and freon gas is supplied to the discharge tube 5. At this point, the freon gas which flows from the recovered freon gas bottle 28, passes through the mist separator 32 to remove any oils or moisture. As a result, contamination of the tubing and the like with lubrication oils, and the generation of by-products, are suppressed, and so efficient and stable supply of the freon gas or the like is possible, and moreover the supply of excess moisture is also prevented, so that any danger of the plasma being extinguished is removed.

Consequently, the plasma can be stabilized, enabling an improvement in processing capacity.

Furthermore, mixing of the steam, argon gas and freon gas, which pass through the heater 18 and flow into the mixer 37, is promoted not only by the pressure loss as the steam, argon gas and freon gas pass through the aperture 38a of the orifice 38, but is also promoted by collision with the exit end face 37A, and consequently the steam, argon gas and freon gas flow out of the mixer 37 in a more uniform mix, and are supplied to the discharge tube 5.

As a result, the decomposition reaction of equation 1 proceeds well, and the production of by-products such as chlorine gas and carbon monoxide can be suppressed.

When microwaves are irradiated into the freon gas supplied to the discharge tube 5 in the manner described above, the electronic energy inside the discharge tube 5 is very high and a thermal plasma of temperature 2000K~6000K is generated. At this point, not only freon gas and steam, but also argon gas, are being supplied simultaneously to the discharge tube 5, and so there is no danger of the plasma being extinguished.

Furthermore, because the tip of the inner tube 11 is positioned further inwards than the tip of the probe antenna 9a by a predetermined distance L, thermal effects from the generated plasma can be avoided, and any melt damage to the inner tube 11 is prevented.

Consequently, marked deformations in the plasma form can be prevented, enabling stable operation of the decomposition process.

Furthermore, because the generation of the plasma places the freon gas in a state where dissociation into chlorine atoms, fluorine atoms and hydrogen atoms will occur readily, reaction with steam through the reaction shown in equation 1 will result in a simple decomposition of the freon gas.

Then, when the plasma is stabilized, the electromagnetic valve 19a is closed and the argon gas supply stopped. Consequently, during the decomposition of the freon gas over a long time period, the supply of argon gas is unnecessary, and so the consumption of argon gas can be suppressed to a minimum.

The product gases generated by the decomposition reaction, are discharged into the alkali solution in the exhaust gas treatment tank 41 by passage through the exchangeable coupling 44 and the blow tube 45. However, because these product gases are at extremely high temperatures, before being passed into the blow tube 45, the gases are first cooled to a temperature of approximately 400° C. by the condenser 46 fitted to the lower section of the reaction tube 15. At such a temperature, any residual steam within the reaction tube 15 will not recondense, and so the inside of the reaction tube 15 can be maintained in a dry state, thereby suppressing any danger of the plasma being extinguished.

The cooling water inside the condenser 46, which has been warmed up to a temperature of approximately 50° C. by cooling the reaction tube 15, is provided to the heater 47 attached to the recovered freon gas bottle 28, and not only prevents the generation of frost on the recovered freon gas bottle 28 and the downstream tubing as the liquid inside the recovered freon gas bottle 28 vaporizes, but also suppresses any pressure fluctuations arising from a drop in temperature. Furthermore, the heat having been absorbed from the water, the cooling water can reused as cooling water for the condenser 46, and so water consumption can be suppressed to a minimum.

Having been cooled by the condenser 46, the product gases are cooled rapidly to a temperature of no more than approximately 100° C. during passage through the exchangeable coupling 44 by a discharge of cooling water from the injection nozzle 51. As a result, the plastic blow tube 45 is able to used within the heat resistant temperature range thereof, and can be protected from heat damage arising from high temperatures. At this point, dissolution of the product gases generated by the decomposition reaction of equation 1 in cooling water produces an acidic solution, and so the exchangeable coupling 44 will gradually corrode, but in such cases, the exchangeable coupling 44 can be replaced when the level of corrosion demands. Consequently, because the only section in the downstream portion of the reaction tube 15 which needs replacing due to corrosion is the exchangeable coupling 44, costs can be lowered, and the replacement operation is also simple.

Furthermore, the product gases, having passed through the blow tube 45 and been discharged into the alkali solution, are rendered harmless by the neutralization reactions of equation 2, and are then expelled from the exhaust duct 42. Because the neutralization reactions are exothermic reactions, the temperature of the alkali solution is maintained at a temperature of no more than 70° C. by the cooler 53 to prevent any heat damage to the blow tube 45. Furthermore the product gases, which are discharged from the tip of the blow tube 45 as gas bubbles, contact the blades 52d of the bubble fragmentation device 52 and are fragmented into fine gas bubbles, and so the contact surface area with the alkali solution is increased, and the time taken for the gas bubbles to reach the surface of the solution is lengthened, thereby promoting the neutralization reactions. Consequently, there is no chance that insufficient neutralization treatment will result in a discharge from the system of a quantity of acidic gases which exceeds the standards.

The neutralized products generated by the neutralization reaction exist as a slurry in the alkali solution, but following the stopping of the decomposition operation, the slurry is transferred together with the alkali solution to a solid-liquid separator 62, and continuously separated into solids and liquids. The separated liquid is returned to the exhaust gas treatment tank 41 where it is reused, and so with a decomposition device of the present invention, this recycling, combined with the aforementioned recycling of the cooling water, produces a marked reduction in water consumption.

Furthermore, following the stopping of the decomposition operation, the air compressor 24 is activated and any residual acidic gases inside the device are scavenged, and so safety is also improved.

An organic halogen compound decomposition device according to the present invention is not limited to the embodiment described above, and also incorporates the following embodiments.

(1) Instead of the orifice 38 provided as a device for promoting mixing inside the mixer 37, beads or the like may also be used to fill the mixer 37.

In such a construction, because the freon gas and the like, and the steam will flow randomly through the gaps formed inside the mixer, the mixing process is promoted.

Furthermore, a plurality of baffle plates may also be installed on the inside surface of the mixer 37 (a static mixer), for example with alternating plates from above and below, or from left and right, with a space between adjacent plates.

In such a construction, because the freon gas and the like, and the steam will snake through the mixer, the mixing process is promoted.

Moreover, the tubing connected to the entrance to the mixer 37 may be inclined at an angle with respect to the direction of flow, and a helical guide plate provided on the inside surface of the mixer 37 (a swirl mixer).

In such a construction, because the freon gas and the like, and the steam will flow with a helical motion, the mixing process is promoted.

(2) Instead of using pH control of the alkali solution as a device for avoiding the discharge of acidic gases outside of the system due to insufficient neutralization treatment, the motor current value may also be controlled.

Such control is possible, because if the revolution speed of the motor drops or stops altogether, then the gas bubbles discharged from the blow tube 45 will not be sufficiently fragmented, and the neutralization reaction will not proceed sufficiently. In this respect, if anomalies in the motor revolution speed are detected based on the motor current value, and operation of the decomposition device stopped by a command from the control device 61, then discharge of acidic gases outside the system can be prevented.

(3) Because the inside of the reaction tube 15 is maintained in a dry state, there is almost no corrosive effect from the acidic gases generated by the decomposition reaction of equation 1. However, in order to improve safety even further, a simple booth which encapsulates the reaction tube 15 may be installed, and an exhaust gas sensor for detecting gases such as $CO_2$ gas and CO gas provided in the space between the booth and the reaction tube 15.

In such a construction, because the corrosion state of the reaction tube 15 can be continuously monitored by the control device 61 via the exhaust gas sensor, then even if for example, the reaction tube 15 corrodes and the product gases generated by the decomposition reaction of equation 1 flow out of the reaction tube, operation of the decomposition device can be stopped by a command from the control device 61, and by removing the discharged product gases by suction, any discharge of the acidic gases outside the system can be prevented. In such a case, the gas suction process can be performed by the blower 43 provided at the exhaust duct 42.

(4) If following the stopping of operations, the slurry inside the exhaust gas treatment tank 41 is left for one night, then the slurry will completely settle out, and so the high concentration settled slurry may also be pumped up with a pump, subjected to solid-liquid separation and then disposed of. In such a case, because the high concentration slurry can be pumped up without mixing with the free alkali solution, a more efficient slurry treatment is possible.

Furthermore, if a granulating agent or a coagulating agent is added to the alkali solution to increase the size of the slurry particles, then the settling time can be shortened, enabling an even more efficient slurry treatment.

(5) Instead of positioning the tip of the Tesla coil 14 inside the discharge tube 5, the tip of the coil may also be positioned outside the discharge tube, and ignition performed by spark discharge.

(6) Instead of heating the recovered freon gas bottle 28 to convert the freon to a gaseous state for discharge, the recovered freon gas bottle 28 may also be inverted and the recovered freon discharged as a liquid, and moreover the flow quantity fixed by passing the freon through a diaphragm device such as a differential pressure control valve, with the freon then being heated and vaporized before being sent to the heater 18.

In such a case, by heating the diaphragm device and the tubing, fluctuations in flow volume resulting from a drop in temperature can be suppressed.

(7) Instead of using the cooling water from the cooling of the reaction tube 15 for heating the recovered freon gas bottle 28, the cooling water from the cooler 53 used for cooling the slurry inside the exhaust gas treatment tank 41 may also be used.

(8) As described above, if the inner tube will not melt, then ideally the tip of the inner tube 11 and the tip of the probe antenna 9a will coincide. In such a case, the distance L by which the tip of the inner tube 11 is retracted inside the tip of the probe antenna 9a will be equal with distance between the tip of the probe antenna 9a and the energy intensive section produced by the microwaves (namely, L=0).

(9) The gas bubble fragmentation device 52 may also be a screw type device in which a propeller is fixed to the tip of the axial section.

Furthermore, the gas bubble fragmentation device 52 may also be constructed so that each of the construction elements 52b, 52c and 52d are made of a plastic such as teflon, with the elements then being screwed together. In such a construction, there are no welded portions, and moreover each of the construction elements 52b, 52c and 52d are made of plastic, and so corrosion resistance can be improved dramatically.

(10) Instead of tilting the tip section of the blow tube 45 at a predetermined angle with respect to the vertical, an approximately U shaped construction may also be used.

(11) The neutralization solution contained in the exhaust gas treatment tank 41 is not limited to the alkali suspension described above, and aqueous alkali solutions such as aqueous sodium hydroxide solution may also be used.

INDUSTRIAL APPLICABILITY

As described above, the organic halogen compound decomposition device, the operation control method therefor, and the decomposition method for organic halogen compounds according to the present invention are applicable to, and ideal for use in organic halogen compound decomposition devices which utilize microwave plasma torches.

What is claimed is:

1. An organic halogen compound decomposition device comprising an exhaust gas treatment tank containing a treatment solution for neutralization treatment of decomposition products from an organic halogen compound, a reaction tube in which an open lower end section thereof is immersed in said treatment solution of said exhaust gas treatment tank, and a microwave plasma torch, in which said microwave plasma torch comprises a cylindrical waveguide made up of an outer conductor and an inner conductor which extends in a vertical direction above said reaction tube, a dual construction discharge tube made up of an inner tube and an outer tube which is provided inside said cylindrical waveguide on the same axis, a heater which heats said organic halogen compound with water, and a mixer which mixes said organic halogen compound and steam which was generated by the heater, wherein a probe antenna formed from an extension of said inner conductor is positioned so as to encircle said discharge tube, and a tip of said inner tube is positioned further inwards than a tip of said probe antenna with regard to a direction along said axis.

2. An organic halogen compound decomposition device according to claim 1, wherein two parallel passages are provided inside the heater and said organic halogen compound is introduced into one of the passages while water is introduced into the other of the passages, and a resistor is filled in the other of the passages in order to resist a flow of the steam which is generated in the other of the passages.

3. An organic halogen compound decomposition device according to claim 2, wherein said resistor is made of inorganic materials.

4. An organic halogen compound decomposition device according to claim 1, wherein an orifice is provided inside said mixer, and an exit end face of said mixer, which faces the orifice, is sloped so that a flow passage cross-section of said mixer gradually narrows.

5. An organic halogen compound decomposition device according to claim 4, wherein an aperture of said orifice has a diameter of 0.1 mm to 5 mm.

* * * * *